Sept. 28, 1926.
H. W. KRANZ
1,601,628
SPOKED METAL WHEEL
Filed Oct. 3, 1924
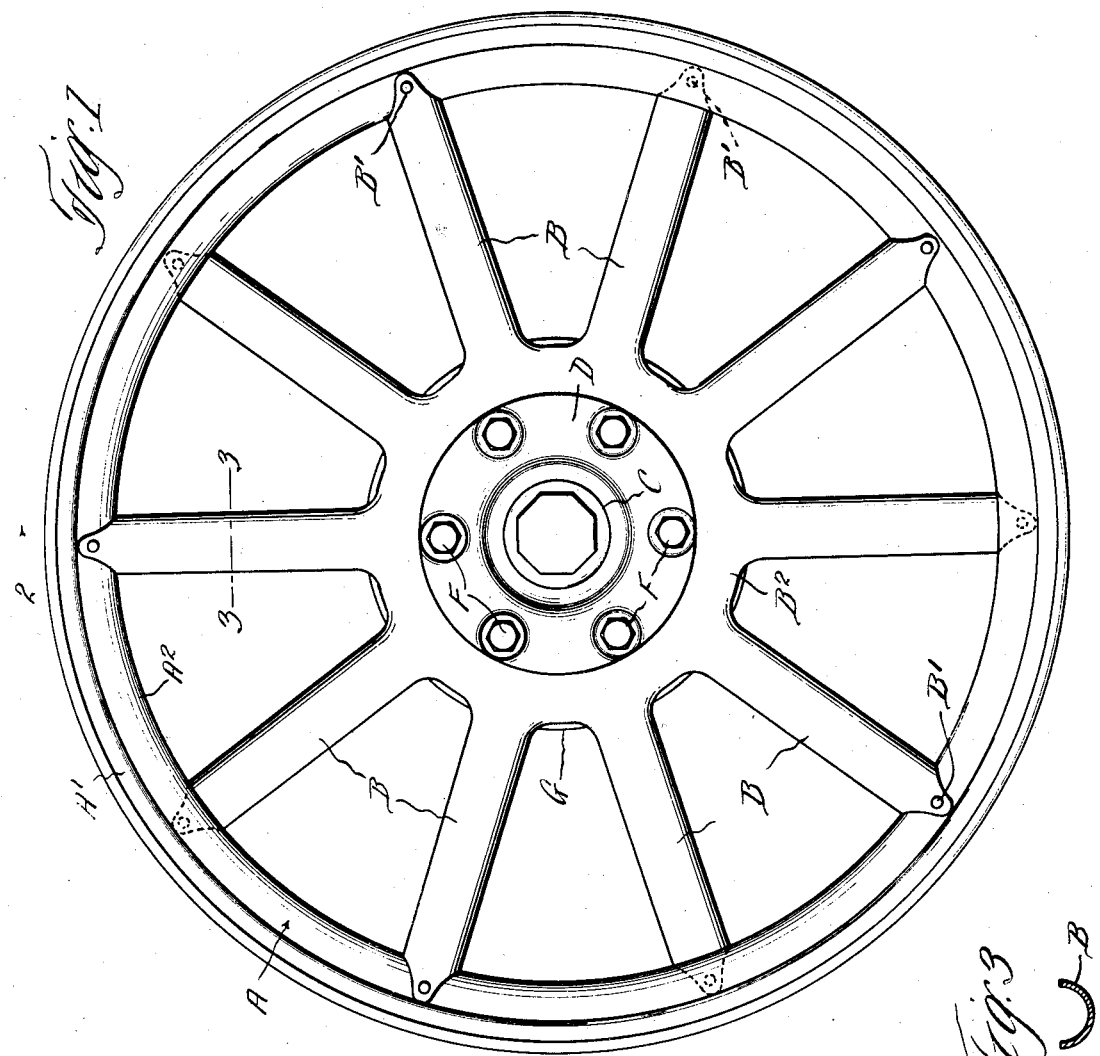
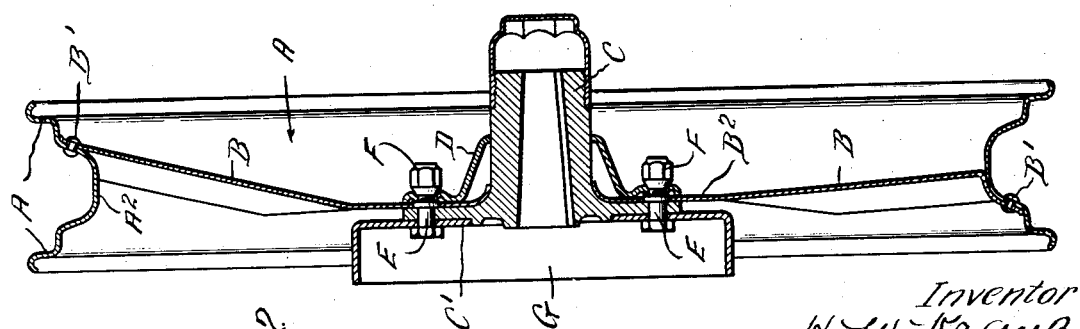
Inventor
H. W. Kranz
By
Attys.

Patented Sept. 28, 1926.

1,601,628

UNITED STATES PATENT OFFICE.

HARRY W. KRANZ, OF CLEVELAND, OHIO, ASSIGNOR TO THE HYDRAULIC STEEL COMPANY, OF CLEVELAND, OHIO, A CORPORATION OF OHIO.

SPOKED METAL WHEEL.

Application filed October 3, 1924. Serial No. 741,328.

This invention relates generally to vehicle wheels and more particularly to a sheet metal wheel particularly adapted for use on automobiles.

At the present time the use of balloon tires has developed a wheel body of smaller diameter and consequently a fixed rim or felly comparatively light has all the strength necessary to carry radial loads, and a light sheet metal spoke structure also possesses abundant strength owing to the fact that the spokes are much shorter.

The object of the present invention is to provide a cheap, simple and durable sheet metal wheel particularly adapted for balloon tires and embodying a deep grooved felly or fixed rim and a short spoked central portion.

The invention consists in the details of construction and novelties of combination hereinafter set forth and pointed out in the appended claims.

In the drawings forming a part of this specification Fig. 1 is a side view of a wheel constructed in accordance with my invention; Fig. 2 is a vertical sectional view on the line 2—2 of Fig. 1; and Fig. 3 is a section on the line 3—3 of Fig. 1.

In carrying out my invention I employ a sheet metal felly or fixed rim A having tire engaging flanges A' and a deep central groove or inpressed portion $A^2$.

A rim of this kind is particularly adapted for use in connection with balloon tires and it can be made for straight side tires as shown, or it can be made for clenchers. The deep groove or central inpressed portion permits the bead at one side of the wheel body to be pushed into the deep groove, upon deflation of the tire, and in this manner the shoe or casing can be easily removed from the felly and a transplit rim is not necessary.

Connected to the sheet metal rim A are the sheet metal spokes B; the outer ends of the spokes being riveted to the outer side of the central portion of the felly as shown at B' and the inner ends of the spokes B are integral with the central circular plate portion $B^2$, which is apertured and flanged to fit upon a hub C having a hub flange C' and a flange ring D also of sheet metal contacts with the hub and plate portion of the wheel body and is secured to the hub bolts E and nuts F.

The bolts E can also serve to connect the brake drum G and wheel body as most clearly shown, but this forms no part of my present invention. Each spoke B is comparatively short and is U-shaped or curved in cross section and is therefore very strong. The outer ends of the sides of the spokes contact with the base of the rim and thereby provide additional support and relieve the rivet of strains.

The spokes B and central plate or nose are all punched at one operation from a plate of sheet metal and if desired, the flanging or curving of the spoke transversely can be accomplished at the same time and it will be understood that the spoke ends are so shaped that when the spoke is flanged or curved the flanges will contact with the inner face of the rim base when the spokes are arranged within and connected to the tire carrying rim or felly.

A wheel body constructed in the manner described is cheap, simple and very strong and durable. It is also capable of supporting heavy radial loads and withstanding lateral strains.

Having thus described my invention, what I claim is:—

1. A wheel body comprising a sheet metal rim and a plurality of spokes integral at the inner ends with a central plate, the outer ends of said spokes being connected to the sheet metal rim, the sides of said spokes contacting with the inner face of the rim base.

2. A wheel body comprising a sheet metal rim having a central inwardly extending portion and a plurality of spokes U-shaped in cross section and integral with a central portion, the outer ends of said spokes being connected to the rim, the ends of the sides of said spokes contacting with the inner face of the inwardly extending portion of the rim base.

3. A wheel body comprising a sheet metal rim having a comparatively deep central inwardly projecting portion, a plurality of sheet metal spokes U-shaped in cross section, the outer ends of said spokes being connected to the outer side of the inwardly projecting portion of the rim, the ends of the sides of said spokes contacting with the inwardly projecting portion.

4. A wheel body including a rim having an inwardly projecting central portion, a hub, a plurality of sheet metal spokes substantially U-shaped in cross section and formed integral with a central apertured plate portion adapted to be secured to said hub, the outer ends of said spokes being curved completmentary to said inwardly projecting portion of the rim and adapted to be connected thereto, and means for rigidly securing the said central plate portion to said hub.

5. A wheel body including a rim having a central inwardly curved portion, a hub, a plurality of sheet metal spokes, substantially U-shaped in cross section and formed integral with a central apertured plate portion and adapted to be rigidly secured to said hub, the outer ends of said spokes being curved complementary to said inwardly curved portion of the rim and adapted to be connected thereto, the outer ends of alternate spokes being secured on one side of said inwardly curved portion of the rim and the outer ends of intermediate spokes being secured on the opposite side of said inwardly curved portion of the rim, and means for rigidly securing said central plate portion to said hub.

In testimony whereof, I hereunto affix my signature.

HARRY W. KRANZ.